United States Patent

[11] 3,557,889

| [72] | Inventor | Jack J. Rejsa |
| | | Minneapolis, Minn. |
| [21] | Appl. No. | 690,872 |
| [22] | Filed | Dec. 15, 1967 |
| [45] | Patented | Jan. 26, 1971 |
| [73] | Assignee | The Pillsbury Company |
| | | Minneapolis, Minn. |
| | | a corporation of Delaware |

[54] METHOD FOR FILLING CONTAINERS WITH PREDETERMINED QUANTITIES OF MATERIAL
5 Claims, 9 Drawing Figs.

[52] U.S. Cl. .................................................... 177/1,
141/1, 141/83; 177/62, 177/123
[51] Int. Cl. .................................................. G01g 13/00
[50] Field of Search ............................................ 177/1, 63,
64, 122, 123, 54, 61, 62; 141/1, 83

[56] References Cited
UNITED STATES PATENTS
3,209,844  10/1965  Stambera et al. ............... 177/64

3,162,258  12/1964  Schmidt ....................... 177/64X
FOREIGN PATENTS
492,634   9/1938   Great Britain ............... 177/1
1,092,684  11/1967  Great Britain ............... 177/122

Primary Examiner—Laverne D. Geiger
Assistant Examiner—Edward J. Earls
Attorneys—Ronald E. Lund and James V. Harmon ABSTRACT: Apparatus for accurately filling packages with granular or fluid material composed of a dispenser for underfilling the packages, a scale for checking the deficiency and a supplemental filling receptacle composed of several sections each containing a different measured quantity of material, e.g. ⅛-, ¼- and ½-oz. quantities. The scale is connected to gates provided in each section of the receptacle for emptying predetermined sections into the package in the proper combination to bring the weight of the package to the target weight in accordance with the measured deficiency. Several receptacles positioned at spaced intervals on an endless chain conveyor are filled at one station and dumped at a second station into the underfilled packages.

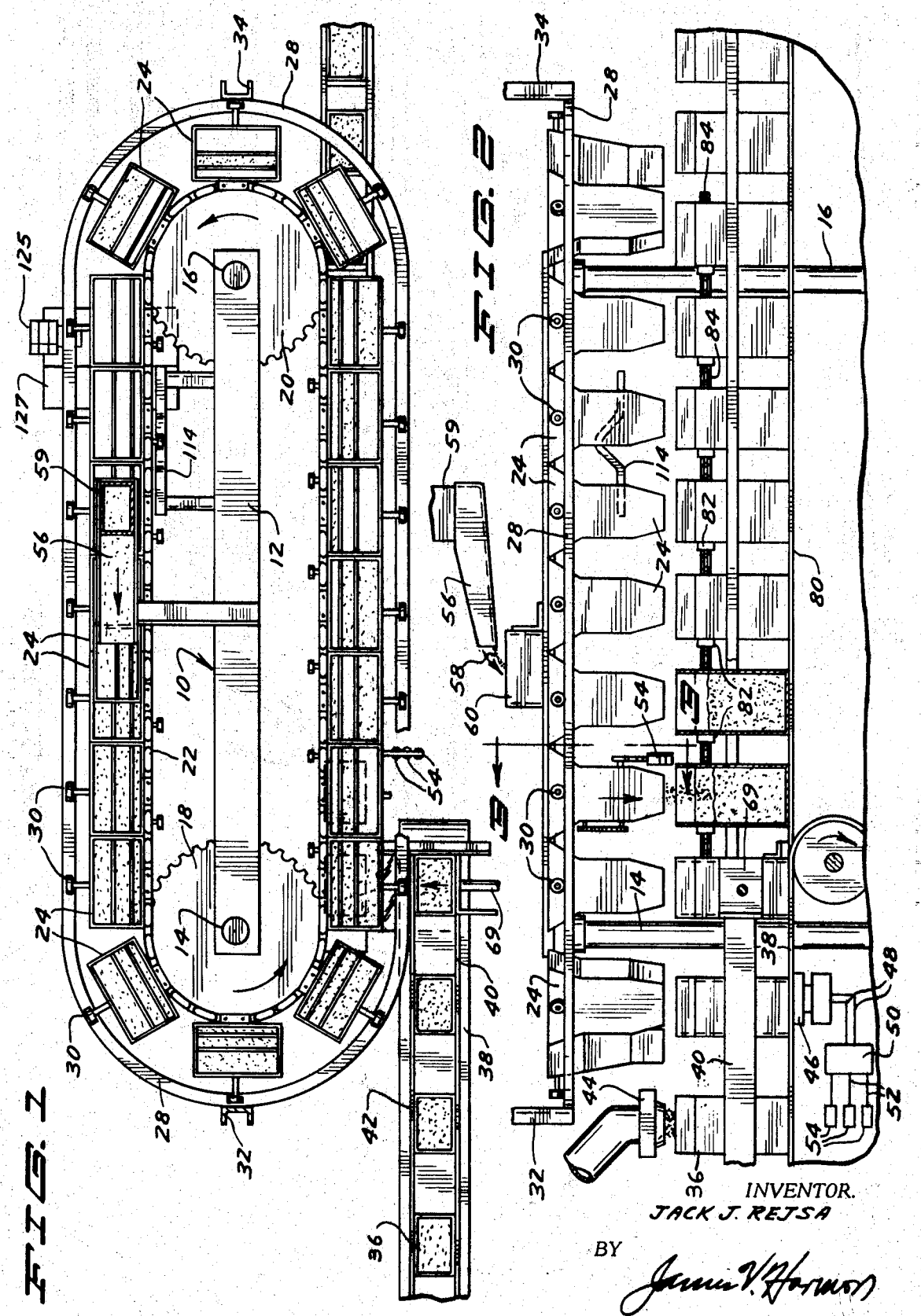

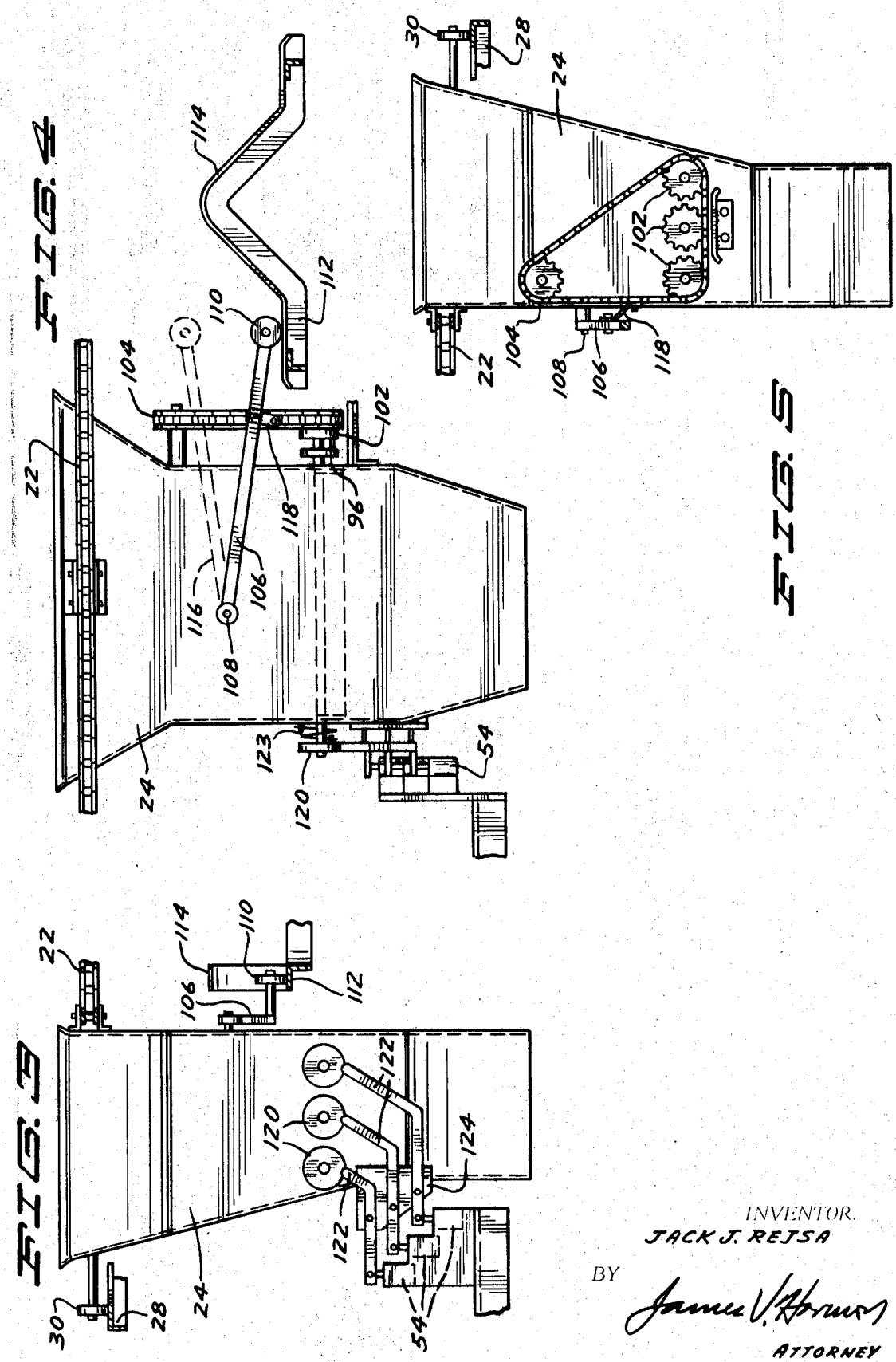

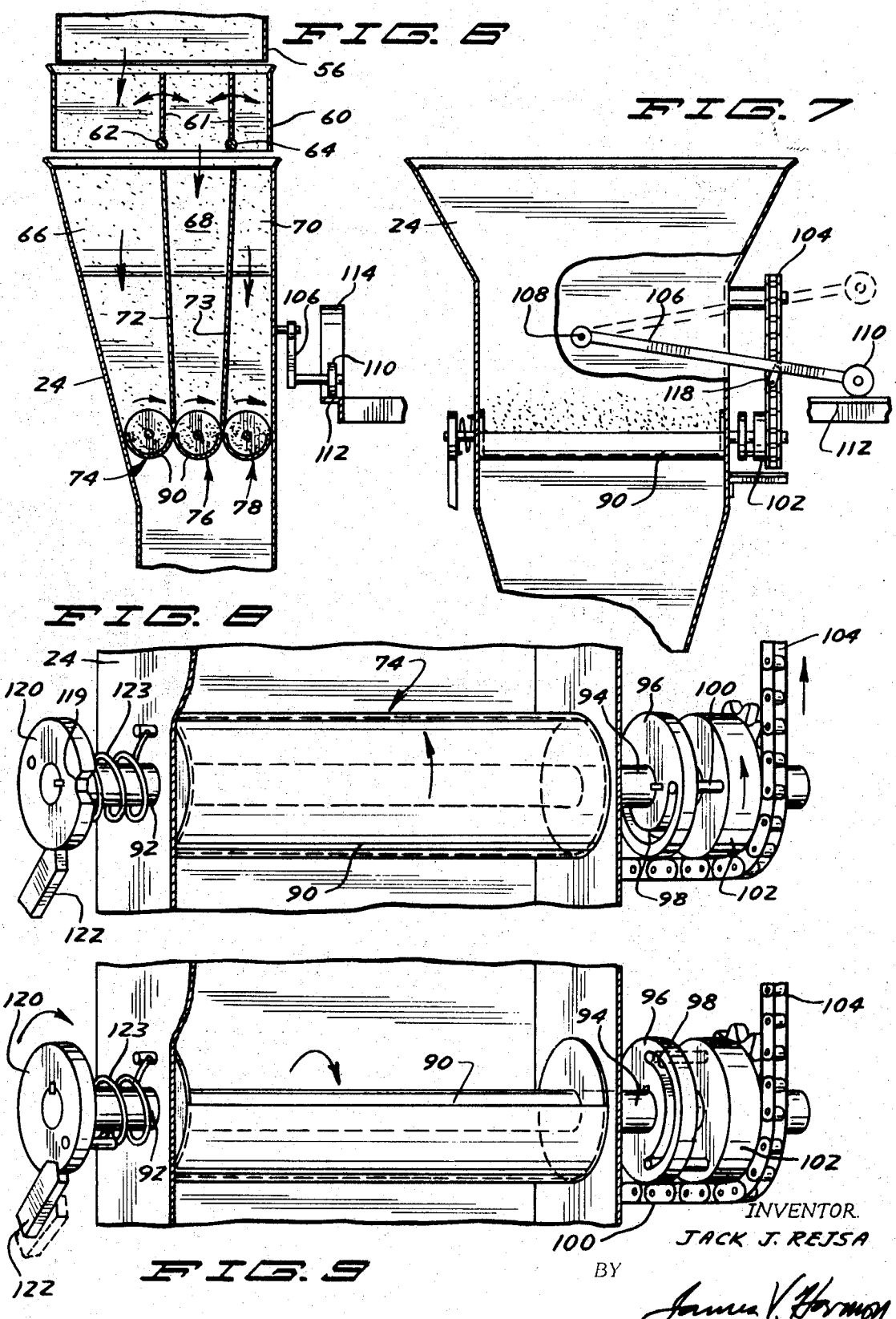

3,557,889

METHOD FOR FILLING CONTAINERS WITH PREDETERMINED QUANTITIES OF MATERIAL

The present invention relates to package filling equipment and more particularly to an apparatus for accurately filling packages Although almost every machine used for packing granular or fluid materials is designed to fill each package with a measured quantity of material, the filling accuracy has not always been satisfactory. This is particularly true when packages are filled at relatively high speeds. In the past, increases in filling speeds have resulted in either excessive deviation from the target weight or a drift in the average fill weight from the preselected target weight.

Most prior filling devices of the general type described operate by first rapidly introducing an amount of material that almost completely fills the package but is somewhat short of the target weight. This operation can be referred to as bulk or approximate filling. The package is then placed on a scale and trim fed by introducing a small stream of material at a relatively slow rate until the scale indicates the target weight at which time the flow is interrupted. It is known that the accuracy with which a weighing can be accomplished is inversely proportional to the speed at which the weighing is made. Thus, the faster the machine is run, the more variation there will be in the weight of the package.

In accordance with the present invention and in contrast with the prior art, filling and weighing are separated in time. This is accomplished by weighing the package and thereafter adding a measured amount which approximates the measured weight deficiency. Because weighing and filling are conducted independently, it is possible to achieve greater weight accuracy than can be obtained in a trim feed operation. With the present invention it is possible to carry out one weighing at a time or conduct a series of weighings simultaneously (provided a sufficient number of scales are used) and to fill each of the packages at a relatively high speed with a supplemental increment of material. The speed at which the supplemental material is introduced will have no effect on the accuracy with which the weighings are made since the two operations are carried out sequentially.

In view of the shortcomings of the prior art, the present invention has among its objects the provision of an improved filling apparatus for fluid and granular materials having the following characteristics and advantages: (*a*) the capability of filling a plurality of packages in rapid succession with predetermined, precisely measured quantities of material; (*b*) the ability to accurately fill underfilled packages with predetermined measured increments of additional material to bring the weight to the required target weight; (*c*) the provision of a filling device which is reliable in operation, rugged in construction and can be manufactured and operated at a reasonable cost; (*d*) a provision for continuous variation in the size adjustment of supplemental filling increments; (*e*) a provision for continuously filling supply hoppers with a predetermined quantity of material without the requirement for weighing the quantities of material placed in the hopper.

These and other more detailed and specific objects will become apparent in view of the following specification and drawings wherein:

FIG. 1 is a plan view of an apparatus embodying the invention.

FIG. 2 is a side elevational view of FIG. 1.

FIG. 3 is a vertical sectional view taken on line 3–3 of FIG. 2 on a somewhat enlarged scale.

FIG. 4 is a side elevational view of the hopper of FIG. 3.

FIG. 5 is an end elevational view of the other side of the hopper from that shown in FIG. 3.

FIG. 6 is a vertical sectional view of a hopper.

FIG. 7 is a partial vertical sectional view of the lower portion of one of the hoppers and one of the gates used for dumping quantities of material from the several sections of the hopper.

FIG. 8 is a front perspective view of one of the gates and the escapement mechanism used for operating the gate as it appears when the escapement mechanism is being energized prior to filling.

FIG. 9 is a view similar to FIG. 8 showing the endmost one of the hopper discharge gates in the position assumed when the hopper is filled.

In accordance with the present invention, the packages are first preferably bulk filled with an appropriate amount of material to almost but not completely fill the package. If, for example, 16 oz. is the target weight, the package is filled to 15½ oz. ½ oz. The package is then transferred from the filling location to a scale and weighed. The package is then weighed and the deficiency, i.e. the difference between the actual weight and the target weight is then accurately measured. This information is stored and used to control the amount of additional material to be added. In accordance with a preferred form of the invention, relatively small measured increments of material are stored in a plurality of receptacles each having a discharge gate for quickly dumping the measured increments in the proper combination to bring the total weight of the package to the target weight.

In the FIGS. is shown one form of incremental filling apparatus in accordance with the invention. The apparatus includes a framework 10 (only a part of which is shown) having horizontally disposed center section 12 rigidly secured to the upward ends of rotatable shafts 14 and 16 to which sprockets 18 and 20 are secured. Entrained over the sprockets is an endless chain conveyor 22 to which a plurality of rectangular hoppers 24 are secured. Each of the hoppers is open at the top and bottom and includes four sidewalls. The hoppers are supported partially by wheels 30 secured to the side of each hopper and resting on an oval rail or track 28. The rail 28 is supported by frame members 32 and 34.

The packages 36 that are to be filled are fed to the apparatus on the upper surface of the endless conveyor belt 38 between guides 40 and 42. They are first filled with a filling apparatus 44 of known construction to a weight which is somewhat under the desired target weight. They then pass over a scale 46 (FIG. 2) and are weighed. The scale 46 is connected by means of conductors 48 to a memory and gate selector circuit 50. The circuit 50 is in turn wired at 52 to the gate control solenoids or actuators 54 (FIGS. 2, 3 and 4) which will be described more fully below.

Granular material is fed to the hoppers 24 in a continuous uninterrupted stream from a vibratory feeder 56 of any commercially available construction. In this way the granular material is provided as an even, smoothly flowing and uniform sheet 58. The granular material is introduced to the feeder 56 through a duct 59.

The sheet 58 passes into a distributor 60 located immediately above the path taken by the hoppers as they travel with a chain conveyor 22 over the sprockets 18 and 20 (see FIG. 6). The distributor is open at the top and bottom and includes a plurality of vanes 61, in this case two, formed from sheet material that extends from one side of the distributor to the other and are mounted for pivotal adjustment at their lower end on pivots 62 and 64. The upper ends of the vanes 61 can be moved either to the left or right as seen in FIG. 6 to control the amount of the sheet 58 that passes on either side thereof. Friction at the pivots 62 and 64 will retain the vanes 61 in the selected position. In this manner, the continuous stream or sheet 58 of granular materials is subdivided into a plurality of streams of selected sizes which pass into the aligned sections or compartments 66, 68 and 70 defined by vertical partitions 72 and 73 within each hopper 24. At the lower end of the compartments 66, 68 and 70 are three gates 74, 76 and 78 which will be described with particular reference to FIGS. 6-–9.

Referring again to FIGS. 1 and 2, the packages are transferred laterally from the conveyor belt 38 onto a slide table to position immediately below one of the hoppers 24 by a plunger 69 that is operated by a cam or other connection (not shown) suitably linked to the sprocket 18. As each succeeding hopper 24 reaches a position in lateral alignment with the plunger 69, the plunger 69 shifts the package laterally to its selected position beneath the hopper. The packages are then engaged by pusher bars 82 secured at longitudinally spaced intervals to an endless chain conveyor 84 entrained over sprockets (not shown) also mounted upon the shafts 14 and 16 and adapted to turn at the same speed and in the same direction as the conveyor chain 22 to thereby advance the packages 36 and maintain them in vertical alignment with the hoppers 24.

Refer now specifically to FIGS. 6, 8 and 9 with reference to a description of the hoppers and their gates. Each of the gates has associated with it an escapement mechanism composed of a ratchet, pawl, slotted plate and sprocket. Since the escapements are identical, only one will be described in detail. The gates consist of a hollow trough member 90 mounted for pivotal movement in the wall of the hopper 24 on horizontally disposed pins 92 and 94. Secured rigidly to the pin 94 is plate 96 having a slot 98 into which projects a pin 100 that is itself rigidly secured to a sprocket 102 mounted loosely over the free end of pin 94 and engaged by a roller chain 104. Motion is imparted at times to the chain 104 by an actuator arm 106 pivotally secured at 108 to the sidewall of the hopper 24 having a cam follower 110 secured to its free end. The follower 110 is engaged on the upper surface of a cam track 112 which has a raised cam portion 114 (FIGS. 2 and 4) adapted when engaged by the follower 110 to raise the arm 106 to the dotted line position 116 of FIG. 4. The arm 106 is in turn connected by means of a link 118 to the chain 104. Thus, raising of the arm 106 moves the vertical segment of the chain, as seen for example in FIG. 5, upwardly thereby rotating each of the sprockets 102 in a clockwise direction as seen in FIG. 5. The clockwise movement of each sprocket 102 causes the pin 100 to engage the plates 96 thereby turning each of the troughs 90 in a clockwise direction as seen in FIG. 5 (counterclockwise as seen in FIG. 8) until the recess 119 of a ratchet wheel 120 secured rigidly to pin 92 engages a pawl 122. A spring 123 connected between the hopper and wheel 120 biases the pin and trough in a clockwise direction as seen in FIGS. 8 and 9. When the recess 119 moves into contract with the end of the pawl 122, the free end of the pawl 122 will drop into the recess thereby preventing the counterrotation of the ratchet wheel 120 and trough 90 due to the action of spring 123.

As seen in FIG. 3, each pawl 122 is pivotally secured to a plate 124 with its outward end positioned to pass immediately over the upper end of one of the solenoids 54 referred to above. During operation, when one of the solenoids 54 is energized, the corresponding pawl will become disengaged from the wheel 120 and the gate will quickly pivot from the holding position of FIG. 9 to the dumping position of FIG. 8 thereby emptying the material contained in the trough into the receptacle positioned beneath it. The measured increments of material within the troughs 90, for example ⅛-, ¼- and ½-oz. quantities, will provide seven weight increments from 0 to ⅞ of an ounce depending upon which trough or combinations of troughs are dumped.

When the hoppers are filled, the quantity of material added will depend upon the speed of the hoppers and the flow rate of the granular sheet 58. When the hoppers are to be emptied any material remaining in the troughs is dumped by the provision of a dumping cam 125 suitably positioned to lift the outward end of all of the pawls as they pass the cams thereby dumping any material that is left in the hoppers 24 into a receptacle 127, the contents of which is returned to the filler 44.

The operation of the apparatus will now be described. To begin the operation, the feed mechanism 56 and the sprockets 18 and 20 are energized so as to fill each trough of each hopper 24. The vanes 61 are then manually adjusted to proportion the material properly between the troughs 90. When this has been done, each of the gates will be filled with the required or selected amount of material, for example ⅛ oz. above gate 78, ¼ above gate 76 and ½ above gate 74. The packages 36 are then filled part way with dispenser 44. If, for example, the target weight is 16 oz., 15 oz. ± ½ oz. should be added by the dispenser 44. The packages then pass over the scale 46 and are weighed. They are next transferred to the slide table 80 and advanced from left to right in FIG. 1 by the pusher bars 82 of the chain 84. The memory and gate selector circuit 50 will then actuate the proper solenoids 54 to provide the correct supplemental fill increment to bring the package up to the desired weight. The filled packages then pass out of the apparatus on table 80 while the hoppers 24 are returned. Their contents, if any, are emptied into the receptacle 127 by the cams 125 and the escapements reenergized by the cam 114.

The filling accuracy will, of course, increase with the number of troughs. Thus, if three troughs are used ranging from ¼ to ½ oz., the accuracy will be as small as the smallest increment or within ¼ oz. of the target weight. With five troughs the accuracy will be within 1/32 oz. or (½)$^n$ where $n$ is the number of troughs.

I claim:

1. A method for accuracy filling packages to a desired target weight comprising, filling the packages to a weight which is less than the desired target weight, placing successive packages on a scale to determine the weight deficiency in each package, providing a plurality of hoppers each containing a quantity of material for making up the deficiency of the weight of the packages, dividing said quantity in said hopper into a plurality of quantities at least one of which differs in weight from the others, placing the hoppers in continuous motion to present each hopper successively at a fill station, feeding the partially filled packages in succession to the fill station and causing the hoppers to empty into the packages when each of the moving hoppers is in alignment with its corresponding package, and emptying said different quantities of material into each package in different combinations to provide a total quantity which is approximately equal to the weight deficiency measured on the scale to thereby add to each one of the packages a total increment approximately equal to the weight of the deficiency.

2. The method of claim 1 wherein said material is continuously fed in the form of an uninterrupted stream to said hopper and the time that the continuous stream is fed to the hopper is controlled to thereby regulate the amount of material fed to the hopper.

3. The method of claim 1 wherein a continuously moving stream of said material is fed to said hopper and wherein the continuously moving stream is subdivided into a plurality of streams of selected sizes which are segregated from one another and stored within the hopper to define said quantities of material.

4. The method of claim 1 wherein one of said hoppers is being filled while another of said hoppers is being emptied.

5. The process according to claim 1 wherein the sum of the different quantities that are added is at least as great as the measured deficiency.